(12) United States Patent
Sekishiro et al.

(10) Patent No.: US 6,296,296 B1
(45) Date of Patent: *Oct. 2, 2001

(54) DOOR TRIM PANEL WITH INTEGRATED DEFROST DUCT AND SUBSTRUCTURE

(75) Inventors: Daryl J. Sekishiro, Lewisville, TX (US); Robert I. Huntley, Grand Junction, CO (US)

(73) Assignee: Paccar INC, Bellevue, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/492,918

(22) Filed: Jan. 27, 2000

(51) Int. Cl.[7] .................................. B60J 5/00; B60J 7/00
(52) U.S. Cl. ......................................... 296/146.7; 296/208
(58) Field of Search .................................. 296/208, 146.7

(56) References Cited

U.S. PATENT DOCUMENTS

| | | | |
|---|---|---|---|
| 3,791,693 | * | 2/1974 | Hellriegel et al. ................. 296/146.7 |
| 4,783,115 | * | 11/1988 | Galubensky et al. ................. 296/208 |
| 4,882,842 | * | 11/1989 | Basson et al. ..................... 296/146.7 |
| 5,095,659 | * | 3/1992 | Benoit et al. ...................... 296/146.7 |
| 5,529,370 | * | 6/1996 | Veit .................................. 296/146.7 |
| 5,584,144 | * | 12/1996 | Hisano ............................... 296/146.7 |
| 5,820,191 | * | 10/1998 | Blakewood, Jr. et al. ......... 296/146.7 |
| 5,846,578 | | 12/1998 | Cesano ................................... 425/503 |
| 5,868,455 | * | 2/1999 | Springer et al. .................. 296/146.7 |
| 5,906,072 | * | 5/1999 | Feige et al. ....................... 296/146.7 |
| 5,906,409 | * | 5/1999 | DeRees et al. .................... 296/146.7 |
| 5,932,331 | * | 8/1999 | Jones et al. ....................... 296/146.7 |
| 6,092,858 | * | 7/2000 | Bolwell . | |

* cited by examiner

Primary Examiner—Joseph D. Pape
Assistant Examiner—Kiran B. Patel
(74) Attorney, Agent, or Firm—Sidley Austin Brown & Wood

(57) ABSTRACT

A door trim panel (10) is disclosed which has an integrated defrost duct (12) and substructure (14) for supporting the arm rest area (16). The panel including the duct and substructure are created in the same mold, eliminating the need for separate molds, a fastening system and assembly time to assemble a separate duct substructure panel.

14 Claims, 3 Drawing Sheets

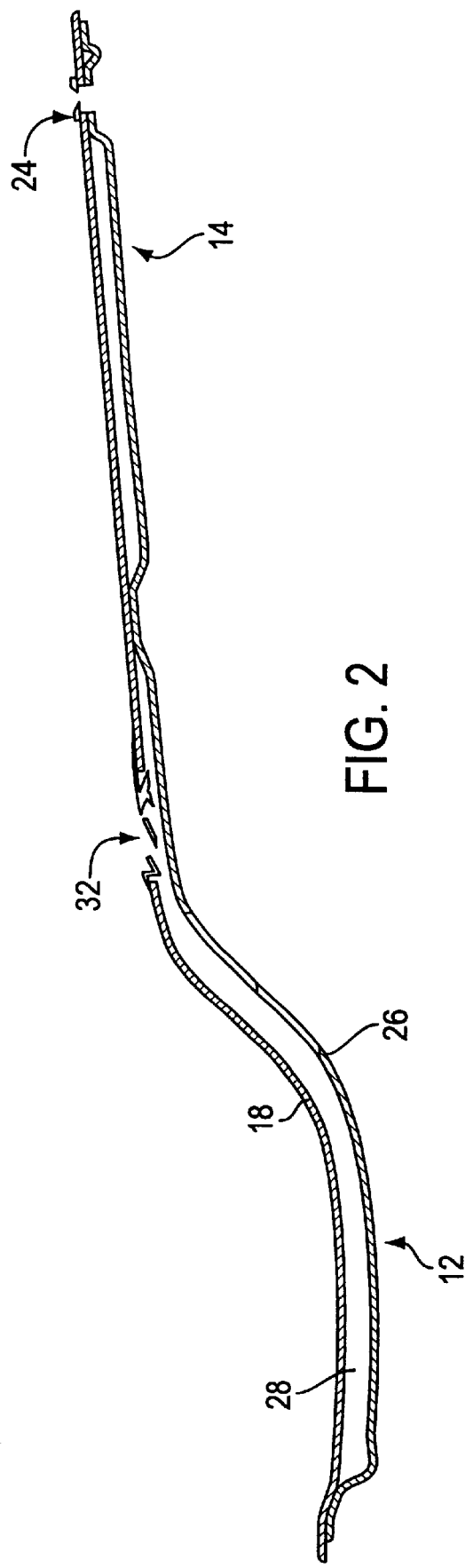
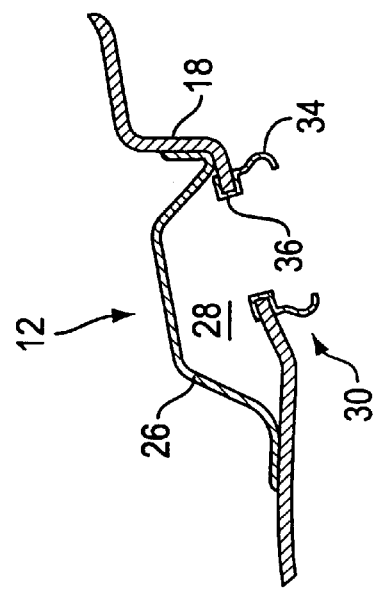

DOOR TRIM PANEL WITH INTEGRATED DEFROST DUCT AND SUBSTRUCTURE

BACKGROUND OF THE INVENTION

The design for a vehicle interior, whether it be a passenger car or industrial truck, is a balance of many demands. For example, the interior must serve functional purposes, such as forming ducts for air flow for air conditioning, heating, defrosting and the like, provide efficient use of space and also provide an attractive appearance.

These demands are particularly important in the type of truck designs used for the common eighteen-wheeler. The sales of such trucks are extremely competitive and a high premium is put on interior designs which are pleasing and useful to the purchaser. Even so, it is important to minimize the cost and difficulty of installing such interior components to remain competitive as well.

SUMMARY OF THE INVENTION

In accordance with one aspect of the present invention, an apparatus is provided for use in a vehicle. The apparatus includes a trim panel with an integrated air flow duct. The apparatus is preferably created in the same mold. The trim panel can be a door trim panel and the air flow duct can be a defrost duct for defrosting rollup glass on a door. Structure can be integrated within the trim panel for support for an arm rest area.

BRIEF DESCRIPTION OF THE DRAWINGS

For a more complete understanding of the present invention and the advantages thereof, reference is now made to the following description taken in conjunction with the accompanying drawings, in which:

FIG. 2 is a cross-section of the door trim panel in FIG. 1 taken along line A—A in the direction of the arrows;

FIG. 3 is a cross-section of the door trim panel of FIG. 1 taken along line B—B in the direction of the arrows;

DETAILED DESCRIPTION OF THE INVENTION

With reference now to the figures, a first embodiment of the present invention will be described. The first embodiment is a door trim panel 10 having an integrated defrost duct 12 and substructure 14 formed underneath the arm rest area 16 in the door trim panel for support.

Figure 1:
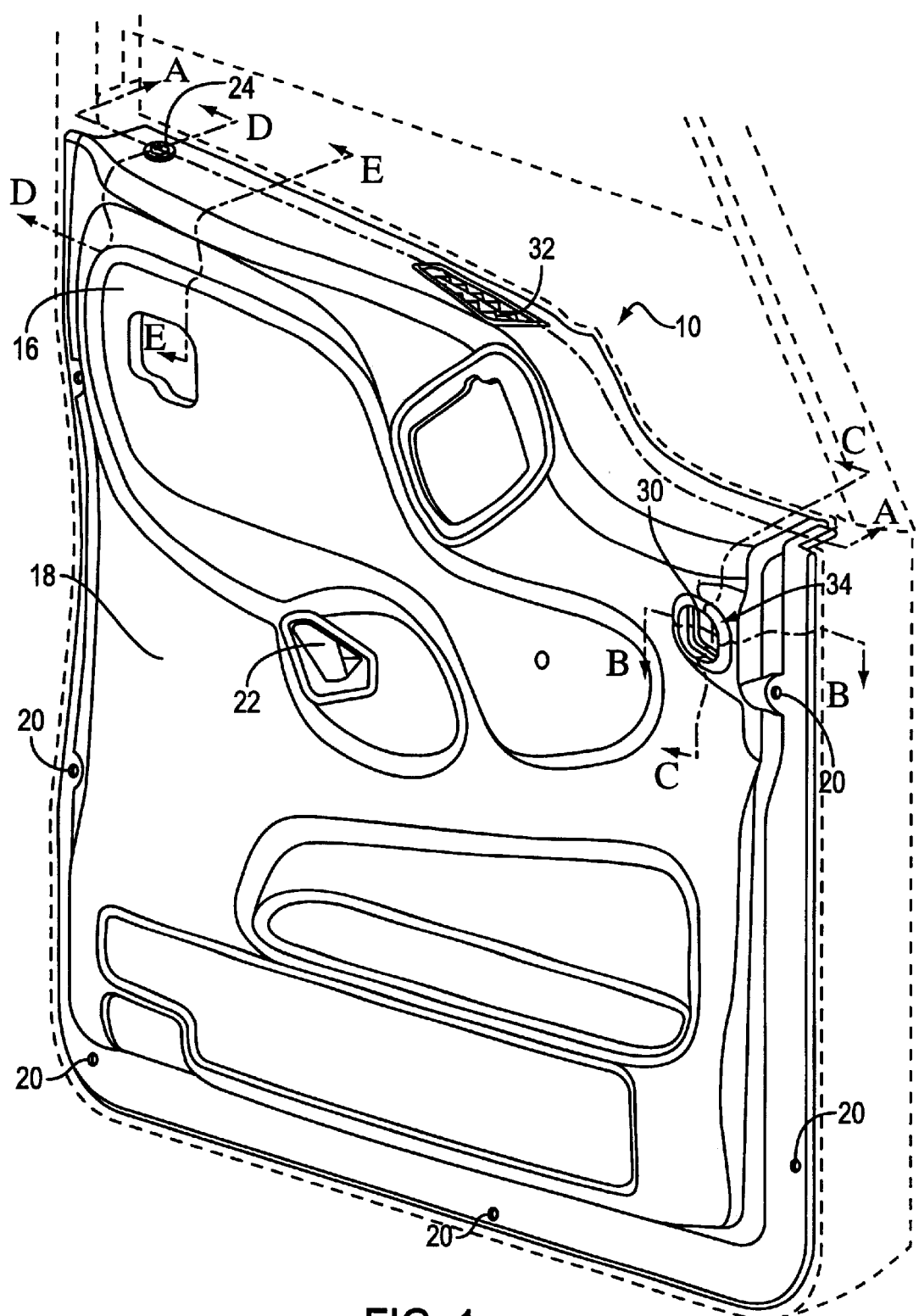
FIG. 1 is a perspective view of a door trim panel forming a first embodiment of the present invention.
Figure 6:
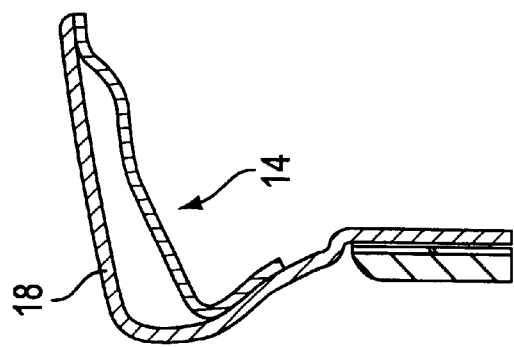
FIG. 6 is a cross-section of the door trim panel of FIG. 1 taken along section E—E in the direction of the arrows.
Figure 5:
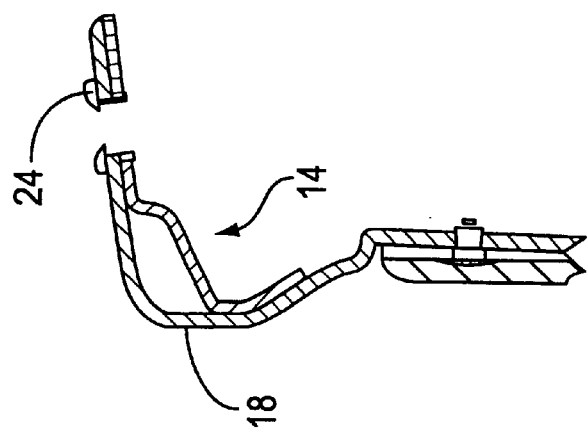
FIG. 5 is a cross-section of the door trim panel of FIG. 1 taken along line D—D in the direction of the arrows.
Figure 4:
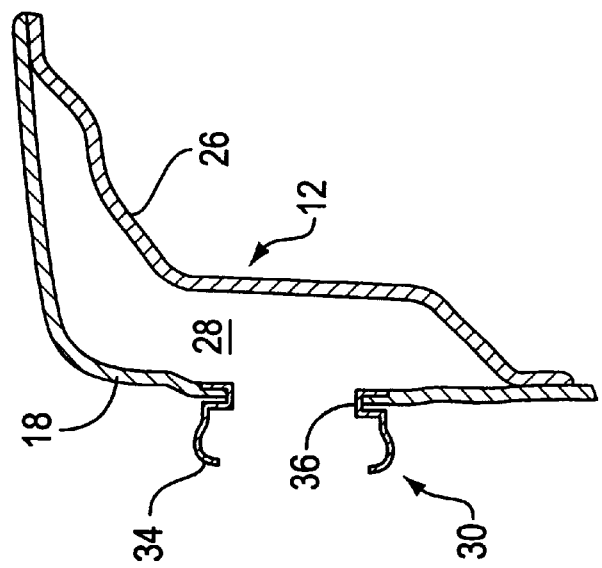
FIG. 4 is a cross-section of the door trim panel of FIG. 1 taken along line C—C in the direction of the arrows.

With reference to FIG. 1, the door trim panel 10 can be seen to include an exposed panel 18 which is molded to provide an attractive and functional shape. In this preferred embodiment, holes 20 about the outer perimeter of the exposed panel 18 are provided for mounting and securing the door trim panel 10 to the door of a vehicle, such as a truck. Various provisions exist for mounting a door handle 22. A grommet 24 is provided for passage of the door lock.

The preferred door trim panel 10 also includes defrost duct panel 26 which is created in the same mold as the exposed panel 18, eliminating the need for separate molds or a fastening system and avoiding any assembly time required to assemble a separate duct and panel. With reference to FIGS. 2–6, it can be seen that molding defrost duct panel 26 and exposed panel 18 in a single mold allows the present invention to form both an integrated defrost duct 12 and a substructure 14 (shown generally as the left and right portions, respectively, of FIG. 2). The integrated defrost duct 12 is formed by shaping at least a portion of the molded structure of defrost duct panel 26 and exposed panel 18 to form an airway duct 28. Airway duct 28 extends from a duct inlet 30 to a duct outlet 32. The duct inlet 30 would be positioned adjacent to a defrost outlet in the vehicle dashboard when the door of the vehicle is closed. The duct outlet 32 is positioned to distribute air along the inside surface of the rollup glass window of the door on which the door trim panel 10 is mounted. Preferably, a flexible bellows 34 is secured around the opening 36 in exposed panel 18 forming the duct inlet 30 to provide a mechanism forming an air seal between the outlet in the dashboard and the inlet duct 30. The bellows 34 will typically be mounted in the opening 36 after the molding of the door trim panel 10. However, if desired, the bellows 34 can be formed as part of the exposed panel 18 as well and molded along with the exposed panel 18 and duct panel 26.

The integrated defrost duct 12 and substructure 14 are produced in their final position in the same mold and in the same molding cycle by molding together duct panel 26 and exposed panel 18, providing great efficiency in assembly and construction. Duct panel 26 and exposed panel 18 can be molded as a single unit (thus forming integrated defrost duct 12 and substructure 14) by the process and apparatus disclosed in U.S. Pat. No. 5,846,578, issued Dec. 8, 1998, the disclosure of which is incorporated by reference herein in its entirety. The process and apparatus includes producing a component from two sheets of thermoplastic material joined together by delivering a compressed air jet between the sheets to expand them against dies.

As can be seen in FIG. 2, the process and apparatus of the present invention thus includes a first wall (duct panel 26) and a second wall (exposed panel 18) molded as a single unit to create an integrated air flow duct (integrated defrost duct 12) positioned between the first and second walls. In this particular embodiment, the integrated air flow duct does not extend along the full length or height of the first wall and the second wall. Instead, as shown in FIGS. 1 and 2, the integrated air flow duct is located between a portion of the first wall and a portion of the second wall such that a substructure and an integrated air flow duct are created. Specifically, this preferred embodiment shows an integrated defrost duct 12 having an airway duct 28 with a vertical height less than the vertical height of exposed panel 18 (as shown in FIG. 1) and with a lateral length less than the length of exposed panel 18 and duct panel 26 (as shown in FIG. 2). The result is that the preferred embodiment creates both an integrated defrost duct 12 and a substructure 14.

When the interior trim panel of the present invention is installed, the first wall (duct panel 26) is oriented to be mounted to the interior of a vehicle structure and the second wall (exposed panel 18) is oriented to be exposed to the interior space of the vehicle. In this manner, the first wall can provide an internal structural support while also operating to enclose the integrated air flow duct (integrated defrost duct 12), and the second wall can offer aesthetic and utilitarian function (i.e., arm rest area 16, door handle 22, grommet 24, etc.) to the interior of the vehicle while also operating to enclose the integrated air flow duct.

Although a single preferred embodiment of the invention has been illustrated in the accompanying drawings and described in the foregoing detailed description, it will be understood that the invention is not limited to the embodiment disclosed, but is capable of numerous rearrangements, modifications and substitutions for parts and elements without departing from the spirit and scope of the invention. For instance, the present invention can be applied to any interior component of a vehicle that requires a duct for air flow for air conditioning, heating, defrosting and the like.

We claim:

1. An interior trim panel for a vehicle comprising:
   a first wall adapted to be mounted to a vehicle structure;
   a second wall adapted to be operatively exposed when the first wall is mounted to the vehicle structure; and
   an integrated air flow duct,
   wherein the integrated air flow duct is interpositioned between at least a portion of the first wall and at least a portion of the second wall.

2. The trim panel of claim 1, wherein the vehicle structure is a door.

3. The trim panel of claim 1, wherein the air flow duct is a defrost duct.

4. The trim panel of claim 1, further comprising a substructure to support an arm rest.

5. The trim panel of claim 1, further comprising a flexible bellows, wherein the flexible bellows is mounted on the second wall.

6. The trim panel of claim 1, wherein the air flow duct has an inlet and an outlet, and the outlet extends through the second wall.

7. A method for producing an interior trim panel for a vehicle using a single mold, the method comprising the steps of:
   providing a first sheet of material;
   providing a second sheet of material; and
   integrating the first sheet of material with the second sheet of material in a manner so as to maintain an air flow duct between a portion of the first sheet of material and a portion of the second sheet of material.

8. The method of claim 7, further comprising the step of providing a substructure prior to the integrating step, wherein subsequent to the integrating step the substructure is integrated into and forms a portion of the trim panel.

9. The method of claim 7, wherein the air flow duct has an inlet, further comprising the step of mounting a flexible bellows on said trim panel at a duct inlet.

10. A vehicle door comprising:
    a door structure having an interior surface;
    a window carried by the door structure; and
    an interior trim panel having a first wall adapted to be mounted to the interior surface of the door structure, a second wall adapted to be operatively exposed when the trim panel is mounted to the door structure, and an integrated air flow duct,
    wherein the integrated air flow duct is interpositioned between at least a portion of the first wall and at least a portion of the second wall.

11. The door of claim 10, wherein air flow duct includes an inlet and an outlet.

12. The door of claim 11, wherein the outlet is directed toward the window.

13. The door of claim 11, further comprising a flexible bellows, wherein the flexible bellows is affixed relative to the inlet.

14. A method for producing an interior trim panel for a vehicle, the method comprising the steps of:
    molding the trim panel,
    wherein the trim panel includes:
       a first wall adapted to be mounted to a vehicle structure;
       a second wall adapted to be operatively exposed when the first wall is mounted to the vehicle structure; and
       an integrated air flow duct,
    wherein the integrated air flow duct is interpositioned between at least a portion of the first wall and at least a portion of the second wall.

* * * * *